United States Patent [19]

Doerfling

[11] 4,372,900
[45] Feb. 8, 1983

[54] METHOD OF FORMING REINFORCED FOAM STRUCTURE

[75] Inventor: Ralph G. Doerfling, Northville, Mich.

[73] Assignee: Detroit Gasket & Mfg. Co., Detroit, Mich.

[21] Appl. No.: 206,496

[22] Filed: Nov. 13, 1980

[51] Int. Cl.³ .............................................. B29D 27/04
[52] U.S. Cl. ................................. 264/45.3; 264/46.4; 264/258; 264/DIG. 65
[58] Field of Search .................... 264/46.4, 46.5, 45.3, 264/258, DIG. 65

[56] References Cited

U.S. PATENT DOCUMENTS

| | | | |
|---|---|---|---|
| 2,879,197 | 3/1959 | Muskat et al. | 264/45.3 X |
| 3,025,202 | 3/1962 | Morgan et al. | 264/45.3 |
| 3,193,598 | 7/1965 | Schafer | 264/45.1 |
| 3,395,201 | 7/1968 | Kalwaites | 264/45.3 |
| 3,867,494 | 2/1975 | Rood et al. | 264/45.3 |
| 3,895,159 | 7/1975 | Yoshimura | 264/45.3 X |
| 4,078,100 | 3/1978 | Doerfling | 264/45.5 X |
| 4,096,303 | 6/1978 | Doerfling | 264/45.5 X |
| 4,241,131 | 12/1980 | Bailey | 264/257 X |

*Primary Examiner*—Philip E. Anderson
*Attorney, Agent, or Firm*—Cullen, Sloman, Cantor, Grauer, Scott & Rutherford

[57] ABSTRACT

A method of forming a reinforced foam structure or laminate wherein a low density, fast reacting liquid foamable resin is sprayed under pressure into a low density fiberglass mat to penetrate and wet the fibers. The foam then expands within the fiberglass mat, forming a low density foam sheet having fiberglass distributed substantially continuously therethrough. A support or cover sheet is preferably laminated to the foam-fiberglass sheet and the laminate is formed under heat and pressure in a die into a contoured shape, simultaneously curing the resin foam.

1 Claim, 5 Drawing Figures

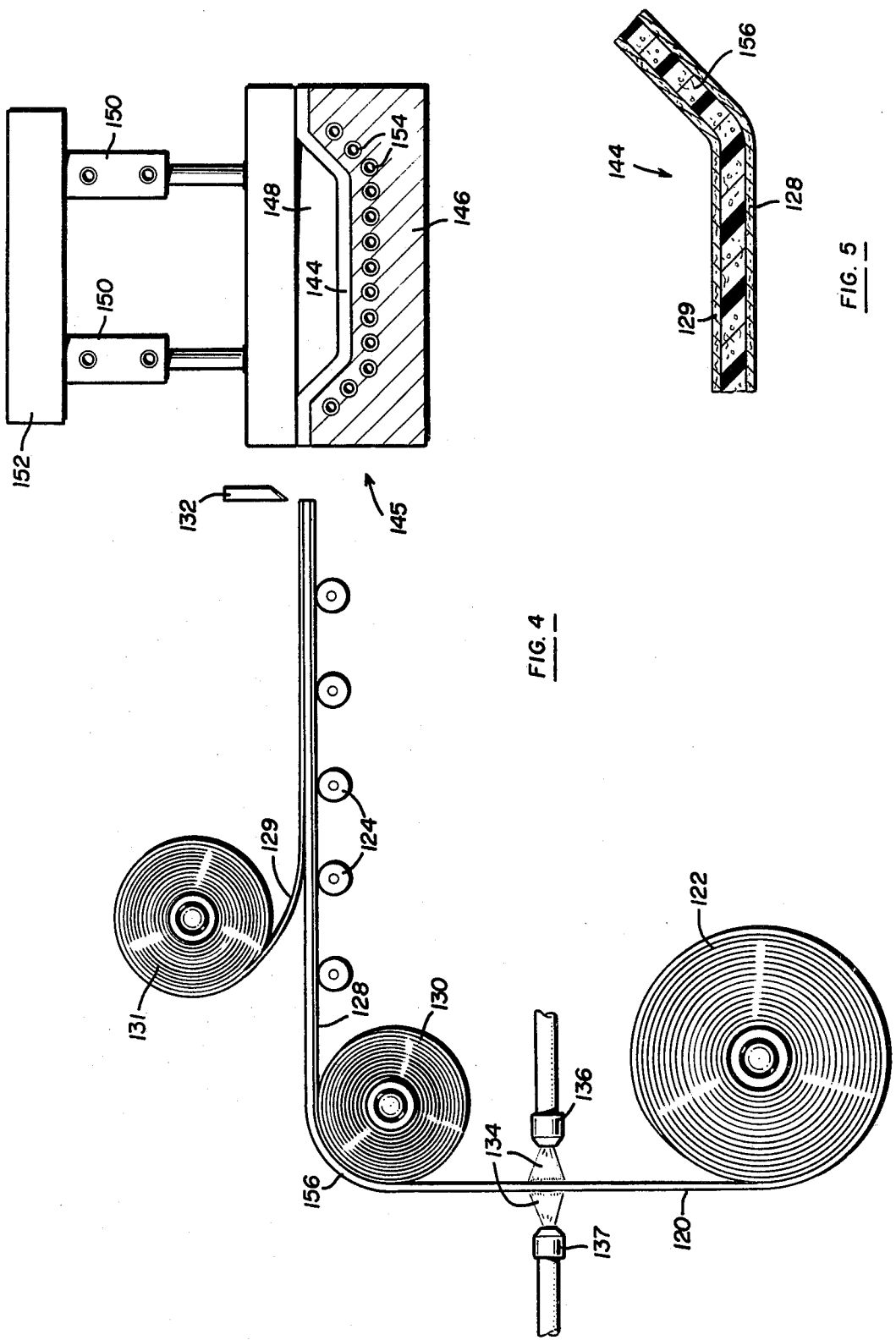

METHOD OF FORMING REINFORCED FOAM STRUCTURE

FIELD OF THE INVENTION

The method of this invention is particularly suitable for forming a contoured low density, fiberglass reinforced, resin form structure or laminate, preferably including a cover sheet, such as cloth or carpet. Foam laminates of this general type are presently used for automotive applications, including contoured wheel covers and interior automotive trim.

Foam laminates of this type are generally reinforced with cardboard, panel board or the like which substantially increases the weight of the foam laminate. An improved method disclosed in my U.S. Pat. No. 4,096,303 utilizes a reinforcing skrim, preferably comprising nonresilient polyester strands retained in an open grid-like pattern of perpendicular strands. A non-resilient skrim however makes the foam laminate less flexible, limiting the applications of the laminate.

The foam structure or laminate of this invention is reinforced with a low density fiberglass mat of coherent loosely woven fibers. It is understood that fiberglass has been used for many years to reinforce resin foams, including polyurethane foam, such as disclosed in U.S. Pat. Nos. 3,193,598, 3,867,494 and 3,895,159. The foamable resin reaction mixture is generally poured over the fiberglass mat in a continuous process wherein the mat is received from a roll, or a batch process wherein the resin foam reaction mixture is injected into a mold.

The method of this invention is particularly adapted to a continuous process of forming a contoured reinforced foam structure or laminate which can not be accomplished by the methods disclosed in the prior art. The contoured foam laminate formed by the method of this invention is strong, yet light in weight and relatively flexible, as now described.

SUMMARY OF THE INVENTION

The method of forming a reinforced resin foam structure of this invention includes spraying a liquid low density foamable resin reaction mixture under pressure into a low density fiberglass mat of fiberglass fibers. The low density fluid thus penetrates and wets the fibers of the mat, such that the reaction mixture foams and expands within the fiberglass mat, forming a low density resin foam sheet having fiberglass fibers distributed substantially continuously therethrough. The foam-fiberglass sheet is then formed in a contoured die under heat and pressure into a contoured shape, simultaneously curing the resin foam.

In the preferred method of this invention, the foam is a low density, low molecular weight open cell rigid or semirigid polyurethane foam having a free blown density of less than about one pound per cubic foot. The preferred fiberglass mat is a coherent mat of loosely woven fibers having a thickness of about one-half to one inch. The resultant foam-fiberglass structure has a density of less than about three pounds per cubic foot. A foamable reaction mixture of this type sprayed under pressure into a loosely woven fiberglass mat will fully penetrate the mat and wet the fibers. Where a highly catalyzed fast reacting foam is utilized, the reaction mixture may be sprayed from opposed sides of the mat to increase the processing speed. The expanding foam reacts within the mat forming a foam layer having fibers substantially evenly distributed throughout the foam.

In the preferred method of forming a carpet backed reinforced foam laminate, the fiberglass mat is first laid on the cover or finish sheet. Where the finish sheet is a pervious absorbant sheet, such as a carpet, the sheet is preferably heated by a radiant heater or the like to reduce foam blowthrough. The fiberglass mat is not heated to avoid premature blowing, wherein the resin reaction mixture will not fully penetrate the fiberglass mat. The foamable resin reaction mixture is then sprayed under pressure into the mat, penetrating to the finish or cover sheet to form an integral laminate including the finish sheet and the foam-fiberglass sheet. Finally, as described above, the laminate is formed in a contoured die under heat and pressure into a contoured shape, simultaneously curing the resin foam.

The resultant foam-fiberglass structure has a very high strength to weight ratio as the structure is very light in weight, yet relatively strong. Where a coherent fiberglass mat of loosely woven fibers is utilized, the resultant structure is particularly strong, including the contoured areas. As described, foam laminates of this type are particularly suitable for auotomotive applications, including interior trim and self-supporting structures, such as trays and load floors, wherein the foam-fiberglass panel may be further reinforced, as required. Other advantages and meritorious features of the method of this invention will be more fully understood from the detailed description of the preferred method of this invention, the appended claims and the drawings, a brief description of which follows.

BRIEF DESCRIPTION OF THE DRAWINGS

FIG. 4 is a partially schematic side view of the method of this invention utilized to form a reinforced foam laminate, wherein the reaction mixture is sprayed from opposed sides of the fiberglass mat; and FIG. 5 is a partial side cross-sectional view of the reinforced foam laminate formed by the method of FIG. 4.

DESCRIPTION OF THE PREFERRED METHOD OF THIS INVENTION

Figure 1:
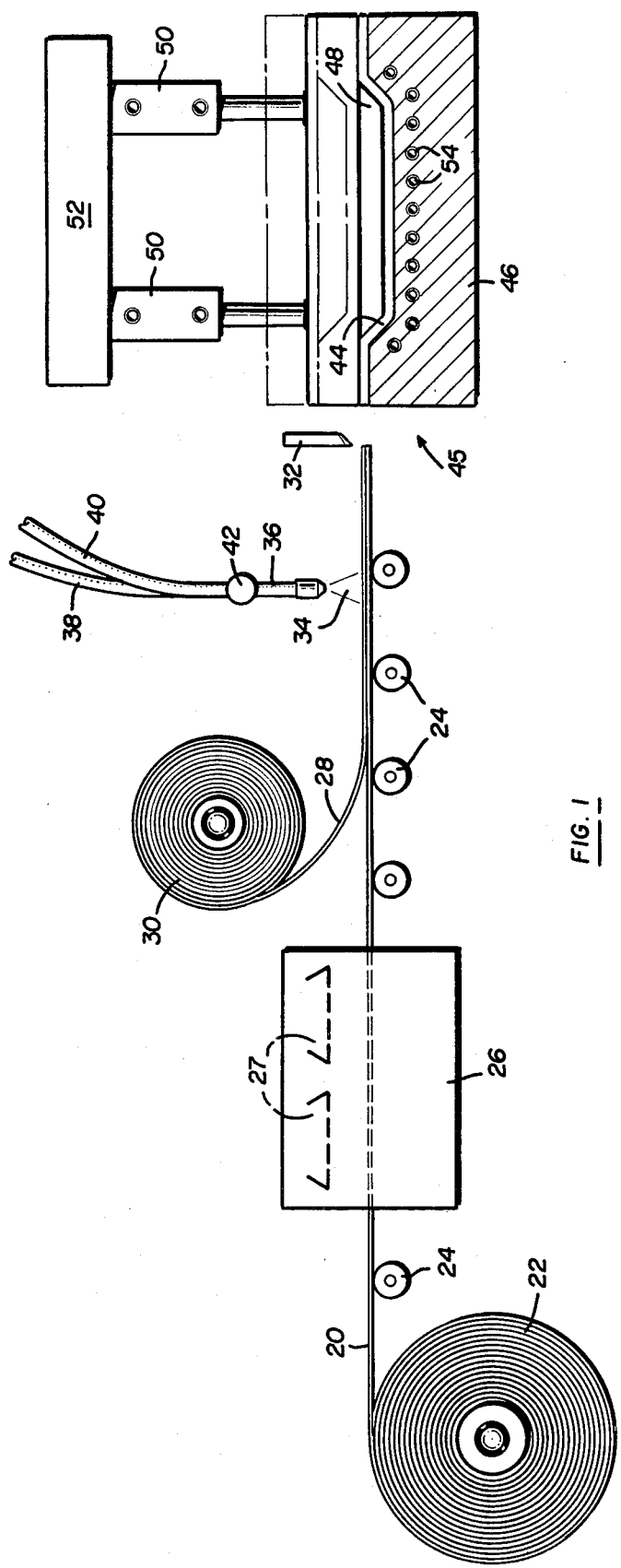
FIG. 1 is a partially schematic side view of the method of this invention used to form a carpet backed fiberglass reinforced foam laminate.
Figure 3:
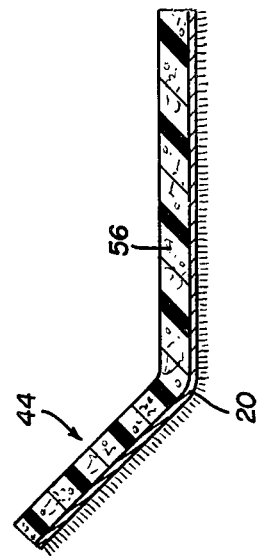
FIG. 3 is a partial side cross-sectional view of a contoured carpet backed reinforced foam laminate formed by the method of FIG. 1.
Figure 2:
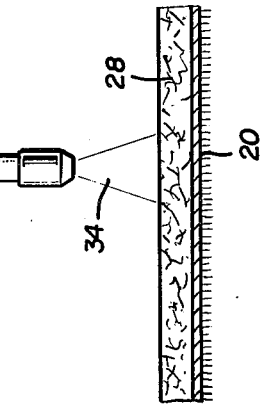
FIG. 2 is a side elevation illustrating the method of spraying the resin foam reaction mixture.

FIGS. 1 to 3 illustrate the preferred method of this invention utilized to form a carpet backed foam laminate. In the disclosed embodiment, the carpet 20 is received from a continuous roll 22 onto rollers 24. Because the carpet includes a pervious backing, as described in my above referenced U.S. Pat. No. 4,096,303, which is incorporated herein by reference, the carpet is preferably heated prior to receipt of the liquid foamable resin reaction mixture to prevent bleeding or blowthrough of the foam through the carpet. In the disclosed embodiment, the carpet is received in a heater station 26 having a plurality of radiant heaters 27. A fiberglass mat is then received on the heated carpet becking from a continuous roll 30. A liquid low densty foamable resin reaction mixture 34 is then sprayed under pressure into the fiberglass mat 28, as shown in FIG. 2. The low densty liquid resin reaction mixture 34 penetrates the mat, wetting the fibers and the carpet backing to form an integral laminate 44, as now described.

The fiberglass mat is preferably a low density coherent mat of loosely woven fibers, such as typically used for furnace and air conditioner filters. The fiberglass mat is preferably coherent and self-supporting, such that the mat can be rolled and used in the continuous process shown in FIG. 1. In the disclosed embodiment, the fibers are substantially continuous, extending several inches to several feet in length and loosely woven to form a continuous mass about one-half inch to one inch in thickness. A suitable low density mat of this type is manufactured by Fibair Company of Morgantown, West Virginia. A typical application utilizes a mat having a thickness of about one inch, having a density of thirteen grams per square foot. The fiberglass fibers have a diameter of twenty microns and the fibers are retained by a resin binder. A typical mat of this type comprises sixty percent by weight fiberglass and forty percent by weight of the binder, such as a urea-formaldehyde resin binder manufactured by Borden, Inc. It will be understood that various fiberglass mats including chopped or loose fibers may be used in certain applications. In the preferred fiberglass mat 28, the fibers are loosely woven such that the liquid resin reaction mixture 34 will penetrate the fibers to the carpet backing or cover sheet 20 to form an integral laminate 44, without soaking the cover sheet, and retaining substantially all of the resin reaction mixture within the fiberglass mat.

The foam resin reaction mixture should therefore have a density low enough to penetrate and wet the fiberglass mat, yet fast reacting to prevent substantial loss of the resin reaction mixture through the mat, or soaking of the cover sheet. The preferred foamable resin reaction mixture is a low density open cell rigid or semirigid polyurethane foam having a free blown density of less than about one pound per cubic foot. The liquid resin reaction mixture includes two components which are received through hoses 38 and 40 into a mixing chamber 42, as shown in FIG. 1. The preferred polyurethane reaction mixture has a low molecular weight, for example 450 grams per gram mole, comprising a polyether polyol blended with ten to fifteen percent polyol.

A suitable polyether polyol is available from Texaco Corporation under the trade designation 650×, which is blended with ten to fifteen percent by weight Texaco 5505 polyol. The polyurethane is preferably highly water blown to provide an open celled rigid polyurethane foam. In a typical example, the liquid resin reaction mixture includes twelve weight percent water. A polyurethane reaction mixture of this type may include about twenty-five weight percent fluorocarbons, such as Freon 11, available from E.I. DuPont DeNemours & Co. and an amine catalyst. As described, the preferred resin reaction mixture is highly catalyzed to provide a fast reacting foam. In this example, two weight percent of an amine catalyst was used, such as Polycat-8, available from Abbot Laboratories in Cincinnati, Ohio. The described polyurethane foam has a free blown density of about 0.75 pounds per cubic foot. However, because of the large surface area of the fiberglass mat, substantial shrinkage of the polyurethane foam occurs. The actual density of the foam, as blown in the fiberglass mat, is about 2.5 pounds per cubic foot.

The low density resin reaction mixture 34 is sprayed into the fiberglass mat 28 under pressure through spray nozzle 36. For example, the water blown rigid polyurethane reaction mixture described above was sprayed at 1000 psi into the low density fiberglass mat described above. The liquid reaction mixture penetrated the mat to the carpet backing and wetted the fibers to form the laminate 44, comprising a low density foam sheet 56 having fiberglass fibers dispersed substantially continuous therethrough. The reaction mixture then foams and expands within the fiberglass mat to substantially fill the mat. The fiberglass mat however remains substantially unaltered, forming a laminate 44 having a high strength to weight ratio, as the resultant structure is very light in weight, yet relatively strong. The laminate is then cut to length by blade 32 and received in a contoured die 45, which forms the laminate into a contoured shape, as now described.

In the disclosed embodiment, the die 45 includes a lower die member or platen 46 having a contoured surface which matches the upper die member or platen 48. In the disclosed embodiment, the upper platen is supported by hydraulic rams or pistons 50 on an upper frame member 52. The dies are preferably heated to simultaneously cure the resin foam. In the disclosed embodiment, the lower platen includes a plurality of heat transfer tubes 54. As will be understood, the upper die member 48 is received into the lower die member 46 under the pressure of rams 50 and the fiberglass sheet is formed into a contoured shape, as shown in FIG. 3, under heat and pressure. The resultant laminate includes the carpet 20, which is permanently and integrally laminated to the low density foam-fiberglass sheet 56. The fiberglass is evenly distributed throughout the foam sheet, including the contoured areas. This foam laminate is particularly suitable for automotive applications, including interior trim, wherein the carpet 20 forms the exterior finish sheet.

The method of this invention disclosed in FIGS. 4 and 5 is similar to the method described hereinabove, but results in a laminate having finish sheets on opposed sides of the foam-fiberglass sheet, as now described. Similar elements are numbered in the same sequence as FIGS. 1 to 3.

The fiberglass mat 120 is received from roll 122 and extends generally vertically as shown in FIG. 4. In the method disclosed in FIGS. 4 and 5, the liquid foamable resin reaction mixture 134 is sprayed from opposed sides of the mat under pressure by nozzles 136 and 137. It will be understood that the nozzles 136 and 137 transverse the mat horizontally as the mat moves vertically, such that the nozzles are not necessarily coaxially aligned. This method does reduce the spraying time and permits the mat to travel at a greater speed.

The cover sheets 128 and 129 are received from rolls 130 and 131, respectively, and the fiberglass mat 120 is received between the cover sheets. The sheets are not necessarily heated because the liquid reaction mixture is not sprayed against the sheets, thus substantially eliminating foam blowthrough. The laminate is then received on rollers 124 and cut to length by knife 132.

As described above, the resin reaction mixture is preferably a fast reacting open cell rigid polyurethane which penetrates and wets the fiberglass fibers of the mat 120. A fast reacting foam is particularly important in the method disclosed in FIGS. 4 and 5 to prevent the liquid urethane reaction mixture from spraying completely through the mat, avoiding substantial material loss. The resin reaction mixture then foams and expands within the fiberglass mat to form a low density foam sheet 156 having fiberglass fibers dispersed substantially continuously therethrough. The cover sheets 128 and 129 are preferably received on the foam-fiberglass sheet 156 while the sheet is wet, adhesive and prior to curing. That is, the foam has expanded to substantially fill the fiberglass mat, but remains adhesive to form an integral laminate comprising the cover sheets 128 and 129 on opposed sides of the foam-fiberglass sheet 156.

The laminate 144 is then received in the die 145 and formed into a contoured shape as shown in FIG. 4. As described, the die member includes a lower die platen 146 and an upper die platen 148, which is supported by hydraulic rams 150, supported on an upper frame member 152. The die member is preferably heated, as described above, which may be accomplished by supplying heated fluid through conduits 154.

The resultant contoured laminate 144, shown in FIG. 5, includes a central foam-fiberglass core 156, which comprises the fiberglass mat and the resin foam as described above. The cover sheets 128 and 129 may be a suitable fabric, vinyl or other impervious finish sheet, carpet or any combination of these. The preferred finish and cover sheets will depend upon the final application. The resultant structure is self-supporting and relatively strong, yet light in weight.

It will be understood that the advantages of the different methods disclosed in FIGS. 1 to 3 and FIGS. 4 and 5 may be combined in various combinations. For example, the foamable resin reaction mixture 34 may be sprayed from opposed sides of the fiberglass mat 28, prior to receipt of the mat on the carpet 20. Alternatively, the resin reaction mixture 134 may be sprayed into the fiberglass mat 120 after the mat is received on finish sheet 128, forming an integral laminate as described in regard to FIGS. 1 to 3. Further, other modifications may be made to the methods described herein within the perview of the appended claims, as now defined.

I claim:

1. A method of forming a contoured fiberglass reinforced thermosetting foam laminate, comprising the steps of:
    (a) laying a coherent mat of loosely woven glass fibers on a finish sheet wherein said finish sheet is a flexible woven sheet of absorbent fibers;
    (b) spraying a liquid low density foamable thermosetting resin reaction mixture into said fiberglass mat, from opposite said mat, under sufficient pressure to fully penetrate said mat of glass fibers and wet said finish sheet, said finish sheet sufficiently pervious to adsorb said liquid resin;
    (c) allowing said liquid thermosetting resin reaction mixture to foam and freely expand within said fiberglass mat for filling said mat and for temporarily bonding said finish sheet to said mat, and said thermosetting resin foam is an open cell relatively rigid polyurethane foam having a free blown density of less than about one pound per cubic foot; and
    (d) immediately placing said thermosetting foam-fiberglass mat and finish sheet laminate in a contoured die, prior to the curing of said foam, and forming said laminate under heat and pressure in said die into a permanently contoured shape and simultaneously permanently bonding said finish sheet to said contoured foam-fiberglass mat; and
    (e) including heating said finish sheet prior to overlying said fiberglass mat on said finish sheet to prevent soaking of said finish sheet with said liquid thermosetting resin, thereby limiting blowing of said thermosetting resin foam through said finish sheet during foaming of said thermosetting resin reaction mixture.

* * * * *